(No Model.)
W. SWAIN & W. PHILIPSON.
TIRE FOR BICYCLES.
No. 488,852. Patented Dec. 27, 1892.
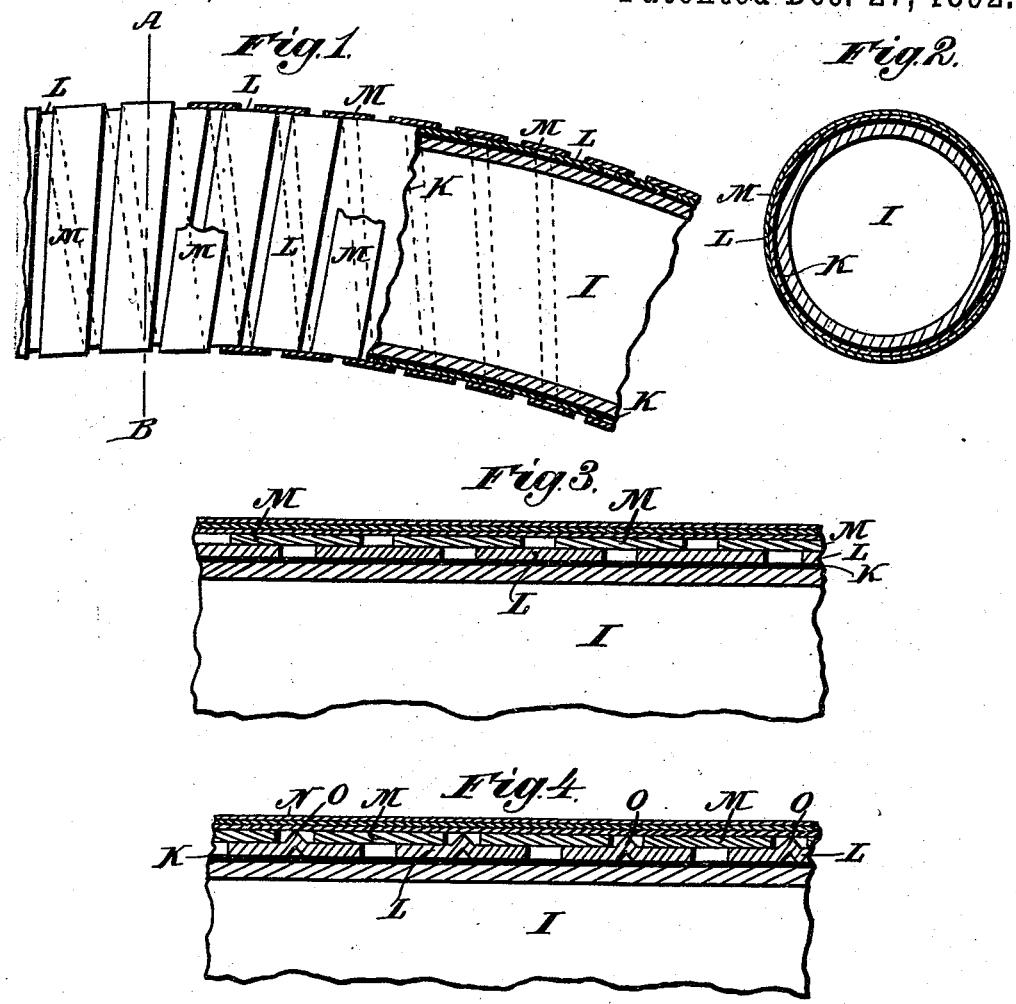

UNITED STATES PATENT OFFICE.

WALTER SWAIN AND WILLIAM PHILIPSON, OF ASTLEY BRIDGE, NEAR BOLTON, ENGLAND.

TIRE FOR BICYCLES.

SPECIFICATION forming part of Letters Patent No. 488,852, dated December 27, 1892.

Application filed July 7, 1892. Serial No. 439,285. (No model.) Patented in England January 11, 1892, No. 529.

*To all whom it may concern:*

Be it known that we, WALTER SWAIN and WILLIAM PHILIPSON, subjects of the Queen of Great Britain, residing at Hillfold Mill, Astley Bridge, near Bolton, in the county of Lancaster, England, have invented new and useful Improvements in the Construction of Tires for Bicycles, Tricycles, and other Road-Vehicles, (for which we have obtained a patent in Great Britain, No. 529, dated January 11, 1892,) of which the following is a specification.

This invention relates to improvements in the construction of tires of wheels for bicycles, tricycles, and other road vehicles, such as, carriages, and the like, in a novel and unique manner and is designed to remove the defects at present existing in pneumatic and other tires inflated by means of air, gas, or liquids under pressure. It is well known that inflated tires are liable to become damaged and cut when traveling over rough roads, consequently are uncertain in their action, which is a source of great annoyance and trouble. Our invention is intended to remove this defect and make them more certain in their action. This we accomplish by inclosing the inflated portion of the tire with a steel or other metallic tape of suitable width to facilitate wrapping in a spiral form and to allow of the same giving and taking under all conditions. In forming the spiral tape round the inflated portion of the tire each layer overlaps the other, and after the entire ring has been covered the ends are secured in any convenient manner. If desired the inflated portion of the tire may be bound longitudinally with a steel or other metallic tape before the spiral one is placed thereon, thereby making the inflated portion of the tire impervious to sharp instruments, tacks, nails, and other analogous articles or substances met with on roads when traveling. In lieu of the spiral tape we may employ a pliable metallic cover composed of steel or other metallic strips or tapes with overlapping and butt-joints; the latter being placed either inside or outside the iron portion of the tire. The butt-joints can be covered with metallic plates in any convenient manner. After the inflated portion of the tire has been incased in our improved manner and secured thereon the whole is incased in canvas or other suitable material or substance.

Figure 1 is a part sectional elevation of an inflatable tire showing one modification of our improved means for protecting the same—Fig. 2 is a transverse section through line A B in Fig. 1—Figs. 3 and 4 are enlarged sections showing more clearly our improved method of incasing the inflatable tire.

F is the rim of the wheel.

H, H are portions of some of the spokes, and I is the india-rubber or other tube inflatable by air, gas, or liquids.

We carry our invention into effect in the following manner:—The india-rubber or other tube I is first inflated, then covered with the canvas, flannel, leather, or other suitable substance K, which may be secured thereon by cement, stitching, india-rubber or other solution. Over the canvas or other substance K is wrapped in a spiral form the steel or other metallic tape L. After the tube I has been wrapped by the steel or metallic tape L the joints of the same are covered in a spiral form by the steel or metallic tape M as shown in Fig. 1, thus causing each layer to overlap the other. Before wrapping the canvas K with the steel or other metallic tape L it may be coated with cement, india-rubber, or other solution to allow of the said tape being thoroughly bedded. After the india-rubber or other tube I has been incased in the metallic tapes L and M, the latter are covered by one or more layers of canvas or other material N. If desired the metallic tape L may be provided with the projections O to insure of the tape M maintaining its position thereon. After entire ring or tube I has been covered by the tapes L and M the ends are secured together by means of a clip, soldering, rivets, or other suitable material, or in any other convenient manner.

If desired this invention may also be carried out as follows:—The canvas K is in the form of a tube which we place on a mandrel, and then coat the outside with solution after which it is wrapped in a spiral form with steel or other matallic tape L. Over this layer of tape we place a layer of linen or other suitable material and coat with solution and wrap again with another layer of steel or other metallic tape M, and cover the whole with linen or canvas. After the mandrel has been withdrawn the tube K is ready to receive the inflatable tube I. After the inflatable tire has been constructed in the form hereinbefore set forth it is sprung on the rim F of the wheel and secured and covered in the ordinary manner.

We claim as our invention:—

As an improved article of manufacture, a pneumatic tire consisting of the tube I, the steel tape L wrapped spirally round the entire circumference of said tube so as to leave spaces between the spirals, a secondary steel tape M wrapped spirally round and breaking joints with said first mentioned steel tape, and a canvas covering N for the said tapes and tube, substantially as described.

In testimony whereof we have hereunto set our hands and affixed our seals in presence of two subscribing witnesses.

WALTER SWAIN. [L. S.]
WILLIAM PHILIPSON. [L. S.]

Witnesses:
JAS. E. BOND,
EDMUND CHADWICK.